United States Patent
Moon et al.

(10) Patent No.: US 8,146,133 B2
(45) Date of Patent: Mar. 27, 2012

(54) APPARATUS AND METHOD FOR MANAGING P2P TRAFFIC

(75) Inventors: Yong-Hyuk Moon, Inchon (KR); Jaehoon Nah, Daejeon (KR); Jaeho Yoo, Gyeonggi-do (KR); Jongsoo Jang, Daejeon (KR); Hyeokchan Kwon, Daejeon (KR); Sunkee Koh, Daejeon (KR); Jabeom Gu, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 782 days.

(21) Appl. No.: 12/169,955

(22) Filed: Jul. 9, 2008

(65) Prior Publication Data

US 2009/0150972 A1 Jun. 11, 2009

(30) Foreign Application Priority Data

Dec. 7, 2007 (KR) .................. 10-2007-0126650

(51) Int. Cl.
*G06F 17/00* (2006.01)

(52) U.S. Cl. .......... 726/1; 726/2; 726/3; 726/4; 726/12; 726/16; 726/17; 726/21; 713/150; 709/201; 709/202; 709/203

(58) Field of Classification Search .......... 726/1–4, 726/12, 16, 17, 21; 713/150; 709/201–203
See application file for complete search history.

(56) References Cited

U.S. PATENT DOCUMENTS

| | | | |
|---|---|---|---|
| 6,754,181 B1 * | 6/2004 | Elliott et al. ............ | 370/252 |
| 6,772,203 B1 * | 8/2004 | Feiertag et al. ............ | 709/219 |
| 7,130,807 B1 * | 10/2006 | Mikurak ............ | 705/7 |
| 7,277,896 B2 * | 10/2007 | Matsubara et al. ............ | 709/203 |
| 7,292,531 B1 * | 11/2007 | Hill ............ | 370/230.1 |
| 7,688,464 B2 * | 3/2010 | Lodolo ............ | 358/1.15 |
| 7,778,194 B1 * | 8/2010 | Yung ............ | 370/252 |
| 7,797,722 B2 * | 9/2010 | Lin et al. ............ | 725/110 |
| 2003/0041141 A1 * | 2/2003 | Abdelaziz et al. ............ | 709/223 |
| 2003/0069973 A1 * | 4/2003 | Ganesan et al. ............ | 709/226 |
| 2003/0126233 A1 * | 7/2003 | Bryers et al. ............ | 709/219 |

(Continued)

FOREIGN PATENT DOCUMENTS

EP 1 096 756 A1 5/2001

(Continued)

OTHER PUBLICATIONS

Thomas Karagiannis, et al: "Transport Layer Identification of P2P Traffic" Internet Measurement Conference 2004, Oct. 25, 2004, 14 pages.

*Primary Examiner* — April Shan
(74) *Attorney, Agent, or Firm* — Ladas & Parry LLP

(57) ABSTRACT

The invention relates to a P2P traffic management apparatus and method. A P2P flow agent monitors an executed application program to extract a P2P application program, adds application identifiers to packets generated by the application program according to a set policy, and transmits the packets. In this case, a P2P security gateway monitors the inflowing packets from the P2P flow agent to extract packets having the application identifiers, uses the extracted application identifiers to inquire and acquire a related policy, and controls the packets according to the acquired policy.

12 Claims, 9 Drawing Sheets

U.S. PATENT DOCUMENTS

| | | | |
|---|---|---|---|
| 2005/0132221 A1* | 6/2005 | Marcjan | 713/201 |
| 2005/0216473 A1* | 9/2005 | Aoyagi et al. | 707/10 |
| 2007/0094272 A1* | 4/2007 | Yeh | 707/10 |
| 2007/0192863 A1* | 8/2007 | Kapoor et al. | 726/23 |
| 2008/0002576 A1* | 1/2008 | Bugenhagen et al. | 370/229 |
| 2008/0181226 A1* | 7/2008 | Varier et al. | 370/390 |
| 2008/0240082 A1* | 10/2008 | Feldman et al. | 370/352 |
| 2008/0307108 A1* | 12/2008 | Yan et al. | 709/231 |

FOREIGN PATENT DOCUMENTS

| | | |
|---|---|---|
| JP | 2004-146973 A | 5/2004 |
| KR | 1020040055196 A | 6/2004 |
| KR | 1020050100143 A | 10/2005 |
| KR | 1020060028853 A | 4/2006 |
| KR | 1020070097485 A | 10/2007 |

* cited by examiner

APPARATUS AND METHOD FOR MANAGING P2P TRAFFIC

BACKGROUND OF THE INVENTION

1. Field of the Invention

The present invention relates to a P2P traffic management apparatus and method, and more particularly, to detecting harmful P2P traffic and control thereof based on a cooperation model between a P2P security gateway and a P2P flow agent to recognize encrypted packets exchanged through a peer-to-peer (hereinafter, simply referred to as P2P) application service or application program on a network or selectively pass, intercept, and control P2P traffic according to a domain policy based on a determination whether information is harmful or illegal.

This work was supported by the IT R&D program of MIC/IITA [2005-S-090-03, Development of P2P Network Security Technology based on Wired/Wireless IPv6 Network].

2. Description of the Related Art

An existing P2P network has been researched and used as technical means that uses distributed computing resources (computers or logical resources, such as files and software) and enables easy sharing of multimedia resources, such as files, music, and moving pictures, provided by a file-sharing service such as Napster, BearShare, Lime Wire, Morphias, Winee, Pruna, and E-Donkey in terms of commerce, or Gnutella, Kazaa, BitTorrent, Pastry, and Chord in terms of research. The P2P network is supported by many people and attracts universal subscribers. Further, the P2P network is used to construct a large-scale computing system using various distributed resources, such as a process cycle, a storage space, and a database, for experimental purposes, such as SATI@HOME.

However, in recent years, among P2P frameworks, which provide hybrid P2P architecture that includes a server in pure P2P architecture, a P2P VoIP service, such as Kazaa-based SKYPE, and a P2P streaming service, such as JOOST, which represents the next-generation TV, are provided through the Internet. Accordingly, it is increasingly required to convert recognition for a P2P network application, which has been used for sharing music files in an MP3 format, or a messaging service.

As such, P2P application services or application programs may be generally defined as network applications that communicate with each other using a P2P network protocol or participate in a network that is composed of peers each serving as both a client and a service or network applications that operate on the basis of a P2P framework, such as JXTA of Sun Microsystems. The P2P application services or application programs may be used for various purposes, such as file sharing, VoIP, moving picture streaming, and distributed computing, according to application objects under various network scales.

In the P2P application services or application programs, according to circumstances, a computer that participates in a P2P network is called a node, a peer, or a host without discriminating terms used in existing computer science or network field. However, it is preferable that the computer be referred to as the peer, because a characteristic of a P2P technology is that it has two functions of providing and using a service without a central server.

The P2P network has unique security requirements (White Washing, ID Spoofing, Sybil Attack, Eclipse Attack, Storage & Retrieval Attack, and Privacy Violation) of only the P2P network due to not only security vulnerability (Man-in-the-middle-attack, Denial of Service, Insertion of Virus, Warm, Spyware, and Spamming) that may be considered in an existing distributed computing environment but also free participation and withdrawal of peers, non-limited generation of new IDs at low costs, and absence of a peer identifier verification structure.

However, the most severe risk to security vulnerability in the 2P network may be the result of the circulation of large P2P traffic (in particular, P2P network used to share files). A P2P file share network has been rapidly developed to such a degree that the traffic amount of the P2P file share network occupies 60 to 80% of the total amount of network traffic. In recent years, Cisco Systems Inc. expresses that it has anticipated that the amount of P2P traffic in 2011 will be at least four times larger than the amount of the current traffic, through a report in 2007. This means that most of the network equipment constituting the Internet consumes a large amount of processing capabilities while processing P2P network traffic. Due to the increase in the amount of network traffic, network bottleneck or congestion frequently occurs. It has been reported that most of the Internet service providers (ISP) incur a large amount of cost loss due to P2P traffic processing. If the P2P users increase and a large amount of application services are provided on the basis of the P2P network, the problem will become severe.

In particular, in recent years, application services and application programs using a P2P network are forming a new content circulation structure or a content delivery network. As a result, security requirements, such as detection and prevention of circulation of illegal materials, propagation of secret materials, and transmission of attached files including malicious codes, are increased, and a P2P technology is actively used as a basic network model to perform various application services. Subsequently, it is anticipated that the Internet traffic share will increase as compared with the related art, and thus, security countermeasure is needed.

In regards to these problems, as a heuristic scheme for resolving traffic congestion or bottleneck caused by a general network application service, a "methodology based on traffic volume threshold and time threshold" has been applied to network equipment (Firewall, Intrusion Detection System (IDS), and Intrusion Prevention System (IPS). In the case of the P2P network, the technology standard (protocol or framework) and a network state that is generated at the time of actually operating a service are very varied, and thus the methodology is not preferable as a method of detecting harmful P2P traffic or recognizing a P2P application service and controlling it.

Methodologies to selectively detect network traffic and control it may be classified into six methodologies including the above-described methodology. In the case of commercially used network security equipment, such as the current IDS and IPS, an attempt to adopt "signature" or a methodology similar to the signature to shutdown a P2P network has been made.

First, a description is given of a packet inspection methodology. The packet inspection methodology may be divided into "stateless packet inspection" and "stateful packet inspection". In the case of the stateless packet inspection, individual packets are determined on the basis of a specific field value of a header or a service port for each of the inflowing packets. In this case, since the packets are individually determined, a network failure that can be determined only when combining a plurality of packets cannot be detected, and it is disadvantageous to port shifting and a random port, which are frequently used in a P2P application service. The stateful packet inspection means a method in which traffic passing through network equipment is inspected on the basis of the signature that is generated through work, such as reverse engineering or packet technology standard analysis for traffic in advance, such that specific network traffic can be discriminated. In order to compare a signature database and types of inflowing packets, both headers of packets and payload need to be checked (even if comparison work is performed on only a layer 7). As a result, a large amount of overhead is generated in network equipment. A separate signature is required for each network application service, and a large amount of time and cost are required during an analysis process for generating one signature.

The packet inspection is based on a regular pattern, while a heuristic methodology is based on an operation characteristic of a network application service or traffic behavior of traffic generated by the network application service. This method may be classified into two methods, "flow level behavior" and "transaction level behavior". The flow level behavior is a method in which specific P2P traffic is detected on the basis of experimental statistics, such as averages, distributions, and deviations of "inter-arrival time, inter-packet difference, duration of flow, and packet size" of packets. The transaction level behavior is a methodology in which a characteristic is extracted from a transition status of an attribute of each packet, such as a packet size or a flow direction, to recognize P2P traffic. However, according to the above-described two heuristic methodologies, if a size of a P2P network is large, a monitoring period is long, or a large amount of geographically distributed peers are experimented, it is possible to extract statistics that are suitable for P2P traffic detection, and the network state is considerably variable according to a non-predicted behavior pattern that are caused by peers that constitute the network. As a result, it is difficult to secure the P2P traffic detection. The corresponding methodologies have technical leadership, but are only exemplified in a document research on a small P2P network that was performed by some researchers. For this reason, it is additionally required to actively and systematically verify effectiveness of the methodologies, and thus an application of the methodologies to commercially used network equipment is not considered.

As the sixth methodology, fragmentary detection rules based on "peer behavior" (in particular, a size of a UDP packet or the number of times of connection, and a connection method (IP addresses and the number of ports)) are suggested. However, the preferred embodiment of this methodology does not exist, and as a result, clear result data for detection that is implemented by the embodiment does not exist.

For reference, each of the above-described methodologies may be merged with other methodologies and individually extended to include a heuristic characteristic. Technical discriminations and definitions may be made using another method.

However, according to the above-described methodologies, it is not possible to provide universally stabilized and significant P2P traffic detection due to the different technical standards of most of commercially used P2P networks and variations generated at the time of operation. In particular, an encrypted P2P packet becomes the main reason why it becomes difficult to detect P2P traffic or a P2P application service. In general, P2P application services, such as SKYPE, BitTorrent, and JOOST, follow the technical standard that is used to encrypt and transmit all data packets including control or signal packets. For this reason, when existing simple matching methods or methodologies depending on the standardized pattern are used, it is not possible to inspect the packets, and thus it is difficult to discriminate P2P traffic. A methodology based on experimental heuristic is insufficient in effectiveness verification through a large amount of experimental examples, and analyzes only an external characteristic or type of a fragmental packet transmission rather than direct analysis on the payload. Embodiments of the methodology are not suggested.

In consideration of the above-described problems, except for the methodology based on peer behavior, most of the existing methods generally analyze the packets on the network and control the inflow of the traffic. Accordingly, as a main method of controlling P2P traffic, only a specific methodology, such as "a model based on interaction between peers and network equipment", will be able to detect encrypted P2P packets and control it.

SUMMARY OF THE INVENTION

Accordingly, the invention has been made to solve the above-described problems, and it is an object of the invention to provide a P2P traffic management apparatus and method that is capable of selectively recognizing and controlling a P2P application service or application program that generates encrypted P2P packets where an inspection on a header or payload is impossible and transmits and receives the packets.

According to an aspect of the invention, there is provided a P2P traffic management system that manages P2P traffic on a network through which encrypted P2P traffic is exchanged. The P2P traffic management system includes P2P flow agents, each of which monitors an executed application program to extract a P2P application program, adds application identifiers to packets generated by the application program according to a policy set for the extracted P2P application program, and transmits the packets; and P2P security gateways that monitor the inflowing packets from the P2P flow agents to extract packets having the application identifiers, use the extracted application identifiers to inquire and acquire a related policy, and control the packets according to the acquired policy.

The P2P traffic management system according to the aspect of the invention may further include a live policy update server that detects a new policy input from a domain manager and provides the detected new policy and operation rules to the P2P security gateways.

The detected new policy may be provided to the security gateways using one of the following methods: a first live policy update method in which the live policy update server transmits the detected new policy to at least one P2P security gateway on the network; and a second live policy update method in which the live policy update server transmits the detected new policy to one P2P security gateway, and one P2P security gateway receives the detected new policy and transmits the new policy to the other P2P security gateways on the network.

The control on the packets may be at least one of selective passage, bandwidth restriction, discard, priority change, and service discrimination of the packets.

In the case of the selective passage and bandwidth restriction of the packets, the application identification information may be removed or unencapsulated from the packets, and the packets may be transmitted to the network.

When detecting the execution of the P2P application program, each of the P2P flow agents may use process execution information of the P2P application program to acquire P2P application program information, use the acquired P2P application program information to inquire a related policy item, and, when an attempt to generate and transmit the packets is detected from a process of the P2P application program, control the packets according to the acquired policy.

Each of the P2P security gateways may include a live policy update unit that receives a policy item from the live policy update server, verifies whether the received policy item is new and a version thereof conflicts with that of an existing policy, and updates data stored in a policy storage according to a verified result.

The live policy update server may receive the new policy input from the domain manager, check whether the received new policy violates an existing basic policy, set the input new policy as a new basic policy according to a checked result, determine which one of the first live policy update method or the second live policy update method is used to update the policy, and transmit the new policy to the P2P security gateways using the determined update method.

When receiving the new policy from the live policy update server using the second live policy update method, each of the P2P security gateways may transmit the new policy to the other P2P security gateways on the network through a P2P method, and each of the other P2P security gateways on the network receive the new policy, verify a version of the received new policy and whether the version thereof conflicts with that of the existing policy, and update data stored in an internal policy storage module according to a verified result.

Each of the P2P security gateways may confirm whether a new policy item is properly applied, determine whether the new policy item needs to be applied to the P2P flow agents, simplify and convert the version of the new policy into a version for the P2P flow agents when it is determined that the new policy item needs to be applied to the P2P flow agents, and transmit the version-converted policy to the P2P flow agents.

Each of the P2P flow agents may receive the policy from the P2P security gateways, verify a format and version of the received policy and whether the new policy conflicts with the existing policy, include the verified policy in the operation, and notify the P2P security gateways of whether the policy verification is completed.

According to another aspect of the invention, there is provided a P2P flow agent that operates in connection with a P2P security gateway to manage P2P traffic on a network through which encrypted P2P traffic is exchanged. In this case, the P2P flow agent monitors an executed application program to extract a P2P application program, and adds an application identifier to each of packets generated by the application program according to a policy set for the extracted P2P application program.

The P2P flow agent according to another aspect of the invention may include an application installation detection module that detects installation of a new P2P application program; an application information management module that stores the detected new P2P application program and inquires and returns information related to the previously installed P2P application program; and an application execution monitor module that monitors whether the P2P application program is executed and packet generation and reports a monitored result. The P2P flow agent according to another aspect of the invention may further include a P2P packet control unit that intercepts, when the detection of packet generation is reported from the application execution monitor module, the generated packets, controls the packets according to a related policy item, and transmits the controlled packets to the P2P security gateway.

According to still another aspect of the invention, there is provided a P2P security gateway that operates in connection with a P2P flow agent to manage P2P traffic on a network through which encrypted P2P traffic is exchanged. In this case, the P2P security gateway monitors inflowing packets from the P2P flow agent to extract packets having application identifiers, uses the extracted application identifiers to inquire and acquire a related policy, and controls the packets according to the acquired policy.

The P2P security gateway according to still another aspect of the invention may include a P2P packet control unit that receives the controlled P2P packets from the P2P flow agent, extracts the application identifiers and related information from the received P2P packets to determine whether the P2P packets are P2P traffic, uses the extracted application identifiers and related information to inquire and acquire the related policy, and performs P2P packet filtering control on the packets according to the acquired policy; and a live policy update unit that receives a policy item from a live policy update server on the network, verifies whether the received policy item is new and a version thereof conflicts with that of an existing policy, and updates data stored in a policy storage according to a verified result.

According to a further aspect of the invention, there is provided a P2P traffic management method that manages P2P traffic on a network through which encrypted P2P traffic is exchanged. The P2P traffic management method includes allowing a P2P flow agent to monitor an executed application program to extract a P2P application program, to add application identifiers to packets generated by the application program according to a policy set for the extracted P2P application program, and to transmit the packets; and allowing a P2P security gateway to monitor the inflowing packets from the P2P flow agent to extract packets having the application identifiers, to use the extracted application identifiers to inquire and acquire a related policy, and to control the packets according to the acquired policy.

According to the aspects of the invention, a cooperation model between a P2P security gateway and a P2P flow agent is used to detect encrypted traffic that is generated by a general application service or application program using various P2P networks and P2P architectures, and the encrypted traffic is controlled according to the policy. As a result, since it is not necessary to observe payload or a header of the P2P packet and analyze it, overhead can be considerably reduced as compared with a methodology depending on an IP packet filtering method, and it is possible to reduce time and cost loss due to separate signature analysis and development according to a P2P application. Further, it is possible to minimize erroneous detections according to the possibility of a quantitative numerical value being changed, which is contained in a methodology based on flow analysis statistics. Therefore, it is possible to securely control the P2P application.

DESCRIPTION OF THE PREFERRED EMBODIMENTS

The invention is different from a method and apparatus according to the related art for providing a P2P traffic detection method using only P2P network packet analysis. Specifically, in this invention, a P2P flow agent is mounted on a peer side and a P2P security gateway is installed on a network, an installation and operation of a P2P application program and service is recognized through a link between the P2P flow agent and the P2P security gateway, P2P traffic is detected on the basis of a cooperation model at the time of generating and transmitting packets, and a procedure of controlling P2P traffic is effectively performed according to a policy, thereby easily achieving detection and control of encrypted P2P traffic corresponding to an object of the invention.

Hereinafter, the preferred embodiments of the invention will be described in detail with reference to the accompanying drawings.

First, a network configuration and a P2P security service structure to which the invention is applied will be described in detail with reference to FIGS. 1 to 3.

Figure 1:
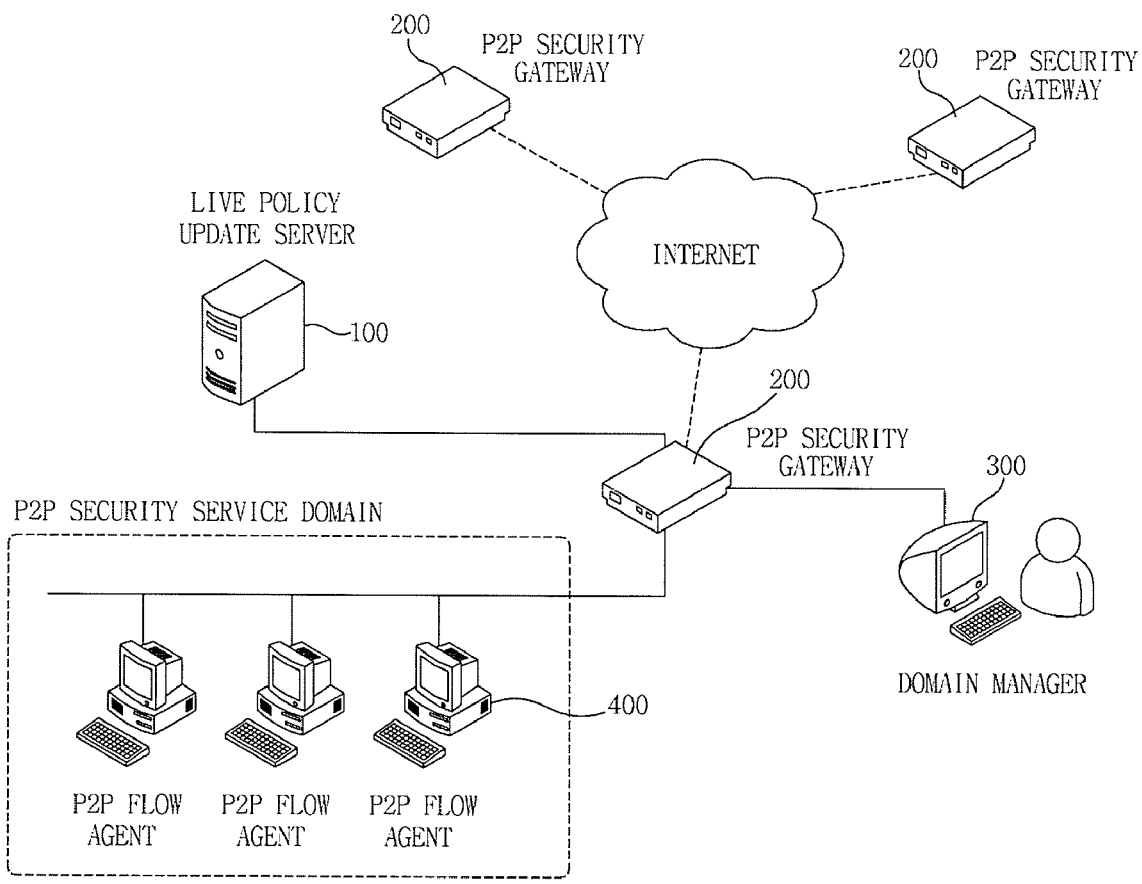
FIG. 1 is a diagram illustrating a configuration of a P2P network to which the invention is applied, which shows an entire P2P security service structure while focusing on a P2P security service domain.

FIG. 1 is a diagram illustrating a configuration of a P2P network to which the invention is applied, which shows an entire P2P security service structure while focusing on a P2P security service domain.

A P2P network according to an embodiment of the invention includes a live policy update server 100, P2P security gateways 200, a domain manager 300, and at least one P2P flow agent 400 that constitutes a P2P security service domain.

Each of peers that exist on one logical P2P security service domain is mounted with a P2P flow agent service (software module), and gateway network equipment is provided with a P2P security gateway daemon (software module). Referring to FIG. 1, the live policy update server 100, the domain manager 300, and the P2P security service domain are connected to each other on the basis of the P2P security gateway 200. This relationship has a structural characteristic that can be comprehensively applied to each of the P2P security gateways 200 that are geographically distributed on the basis of the Internet.

In this case, the P2P security service domain may have various meanings. That is, the P2P security service domain may be a work group that constitutes an office network, a subnetwork that is discriminated by a subnet mask, an arbitrary network of a small unit that is composed of Ethernet, a logical unit network region where the same policy is applied, a group of peers that are disposed at locations physically adjacent to each other, or a subnetwork of a P2P service network.

As can be known from the present network configuration, except for the case of managing the network equipment or updating a policy, it is assumed that a separate central server does not exist in the P2P service. That is, the P2P flow agent 400 functions as a servant that actually participates in a P2P network and uses a general P2P application service. The P2P security gateway 200 as network equipment detects and controls P2P traffic that is generated when using a P2P application service. The live policy update server 100 and the domain manager 300 function as a management domain that controls the operation of the P2P security gateway 200 according to a network environment and a condition change of a P2P application service.

Figure 2:
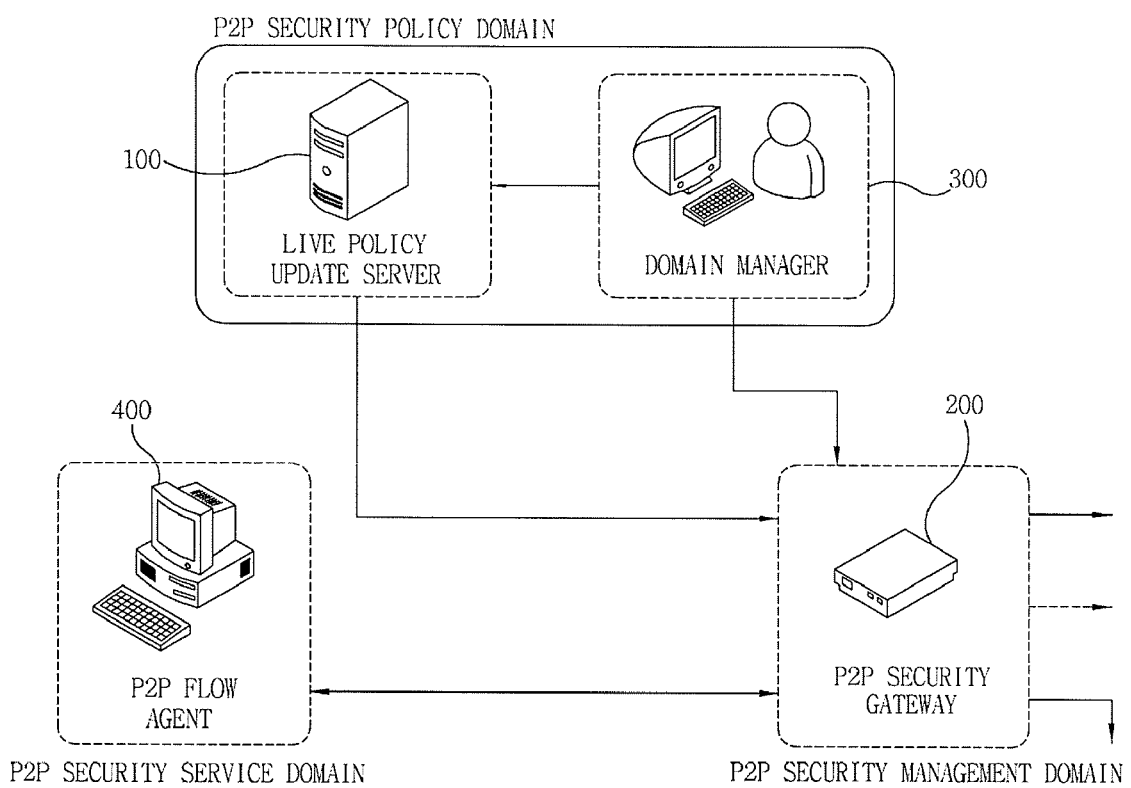
FIG. 2 is a diagram illustrating the association relation and interaction between components shown in FIG. 1.

FIG. 2 is a diagram illustrating the association relation and interaction between components shown in FIG. 1.

In FIG. 2, a P2P security policy domain, a P2P security service domain, and a P2P security management domain mainly exist.

First, the P2P security policy domain includes the live policy update server 100 and the domain manager 300. The P2P security service domain includes a peer that is mounted with the P2P flow agent 400, and the P2P security management domain includes the P2P security gateway 200.

Hereinafter, a description is given of the operation that each of the components functions in connection with the other components connected to the network in order to recognize a P2P application service and detect/control traffic, and a result thereof, when each of the components performs an individual function.

The domain manager 300 determines a local network service rule that is operated by one P2P security gateway 200, and applies a determined policy to individual network equipment. The domain manager 300 may have access to the P2P security gateway 200 to change a policy of the P2P security gateway 200 or maintain/repair a system. Access authentication and authority verification items are based on a general method of network security and computer science. However, the invention is not limited thereto, and various methods may be used.

In order to determine policies of various local networks observed by at least one P2P security gateway 200 and applies the policies to the P2P security gateway 200 on an entire network according to a network situation, the domain manager 300 provides a description of a corresponding policy to the live policy update server 100. If the live policy update server 100 is instructed to propagate a new or updated policy item, the live policy update server 100 has access to each of P2P security gateways and informs each P2P security gateway that the policy item is updated and transmits a related specification to each P2P security gateway. The method of updating a policy will be described in detail below with reference to FIGS. 3, 4, and 9.

The P2P security gateway 200 is mounted with policy and operation items that are capable of detecting and controlling P2P traffic. The P2P security gateway 200 functions as a P2P security management domain that detects security vulnerability, which may occur due to traffic generally generated by a P2P application service, and resolves a problem of the security vulnerability.

Hereinafter, specific policy application will be described.

In order for the P2P security gateway 200 to smoothly operate on the basis of the applied policy, previous adjustment is needed, such that the P2P security gateway 200 can share the same operation rule with the P2P flow agent 400 located at the P2P security service domain to cooperate with each other. The previous adjustment may be performed when the policy and operation rules mounted on the P2P security gateway 200 are changed, and may be dynamically made according to a P2P network operation characteristic.

Finally, P2P packets that are generated by a P2P application service of a peer are transmitted to the P2P security gateway through the P2P flow agent 400, and the P2P security gateway 200 may perform a procedure, such as passage S812, bandwidth restriction S813, and discard S814, according to a mounted policy.

A category of applicable packet control procedures is not limited to the above-described example, and various packet control procedures may be designed by policy developers and network operation planers and used.

Figure 3:
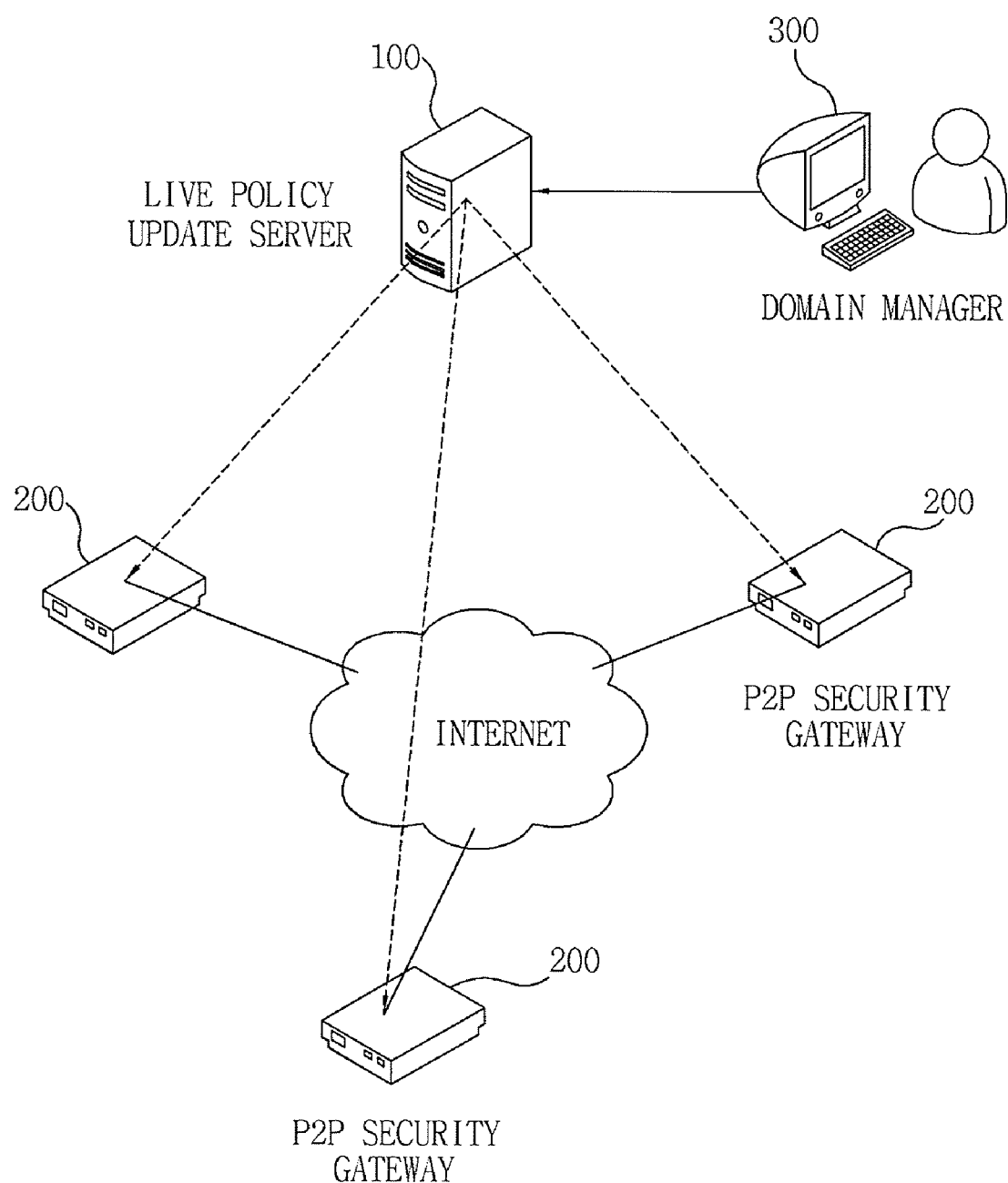
FIG. 3 is a diagram illustrating a live policy update method based on a central server to update a policy according to a preferred embodiment of the invention in real time.

FIG. 3 is a diagram illustrating a live policy update method based on a central server to update a policy according to a preferred embodiment of the invention in real time.

Referring to FIG. 3, when a new policy and operation rules are transmitted from the domain manager 300 to the live policy update server 100, the live policy update server 100 detects the transmission, and transmits the new or updated policy to the P2P security gateway 200 in charge of each P2P service domain immediately or at a predetermined policy update time.

Accordingly, a live policy update model according to this embodiment has a characteristic in that the updated time and cost are determined according to the size of data and the number of the P2P security gateways 200 to be updated, which are needed to be transmitted when a policy is updated.

Figure 4:
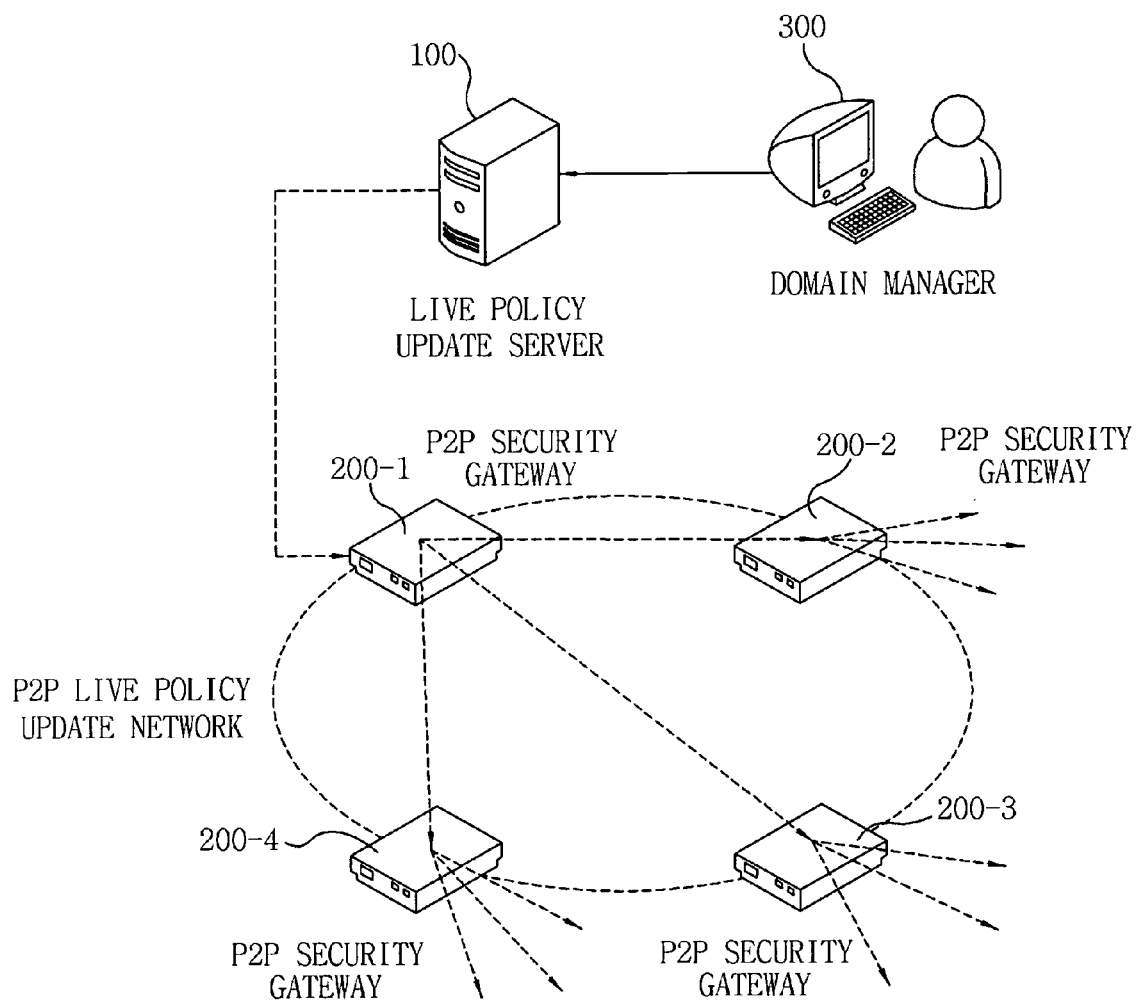
FIG. 4 is a diagram illustrating a live policy update method based on a P2P network to update a policy according to a preferred embodiment of the invention in real time.

In this case, a live policy update model according to a modification shown in FIG. 4 may be additionally considered.

FIG. 4 shows a live policy update method based on a P2P network to update a policy according to a preferred embodiment of the invention in real time.

In the policy update method according to the related art, as shown in FIG. 3, a policy or data updated depending on the central live policy update server 100 is transmitted, while in a policy update method according to this embodiment, as shown in FIG. 4, corresponding policy or data is transmitted by a P2P method from network equipment including previously updated policy or data, that is, a P2P security gateway 200-1 to the other P2P security gateways 200-2, 200-3, and 200-4 where an update operation is not made.

The communication, which is used to update a policy between the P2P security gateways 200, may be performed such that it does not create an unnecessary channel structure, such as infinite data propagation and loop, using a numerical value, such as TTL (Time-To-Live). In order to perform mutual authentication, a separate central authentication server may be installed or a self-generated cryptography key and a trust model, such as Web-of-Trust passing through a third party, may be used. However, the invention is not limited thereto.

A process of causing the P2P security gateway 200-1 to check a policy version of each of the other P2P security gateways 200-2, 200-3, and 200-4 to update its policy to the newest policy and a live policy update process based on a P2P network between the P2P security gateways may be performed on the basis of a general network policy update method.

Thus, the invention may provide an advantage in operation in that one of the two models may be selected in consideration of the network situation and costs and the live policy update process may be performed.

Until now, the technical characteristic of the invention has been schematically described while focusing on the network configuration to which the invention is applied.

Next, the detailed structures of the P2P flow agent and the P2P security gateway of the network components will be described with reference to FIG. 5.

Figure 5:
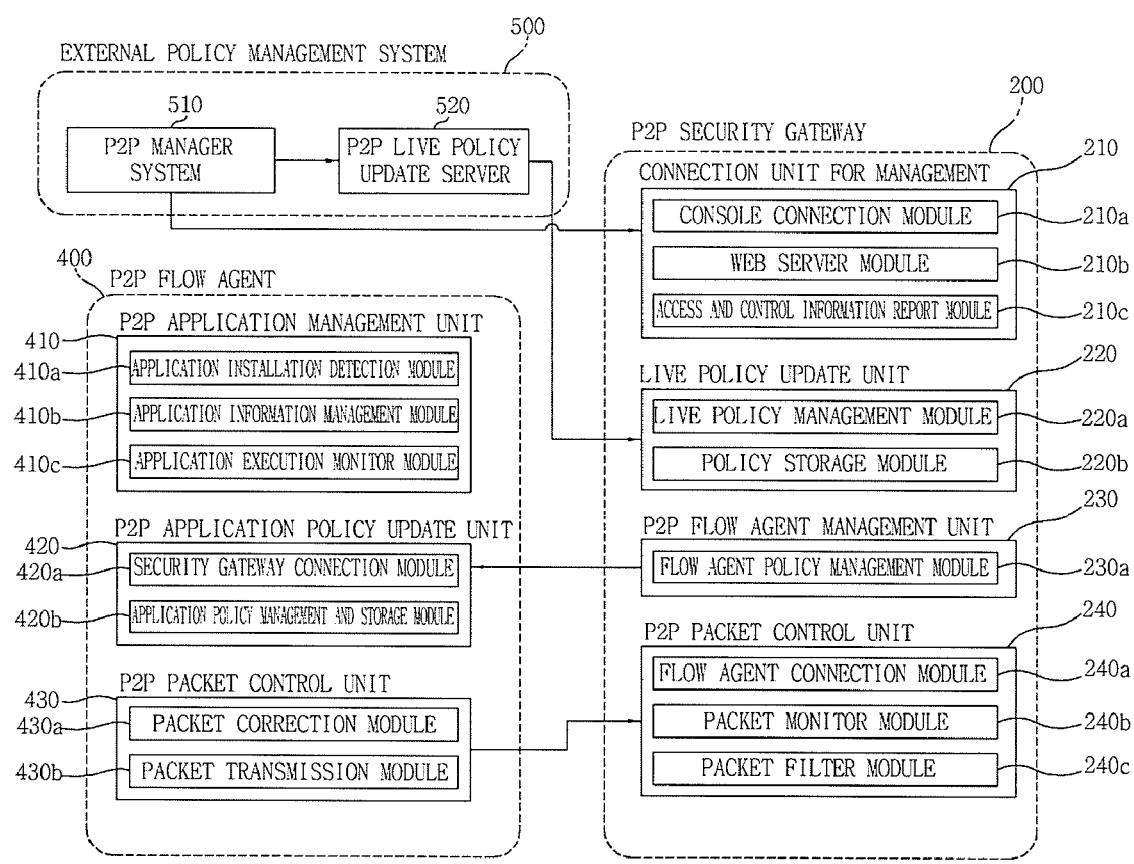
FIG. 5 is a block diagram illustrating the detailed configuration of a P2P flow agent and a P2P security gateway according to an embodiment of the invention.

FIG. 5 is a block diagram illustrating the detailed configuration of a P2P flow agent and a P2P security gateway according to an embodiment of the invention.

The P2P security gateway 200 according to the embodiment of the invention as a link system is connected to an external policy management system 500. The P2P flow agent 400 mainly includes a P2P application management unit 410, a P2P application policy update unit 420, and a P2P packet control unit 430.

The P2P application management unit 410 recognizes a newly installed P2P application program and service through an application installation detection module 410*a*. The P2P application management unit 410 extracts information on the completely installed P2P application program from a registry and a program setting file through an application information management module 410*b*, stores the information, and manages the information.

If detecting the execution of the P2P application program while monitoring the execution of the P2P application program, an application execution monitor module 410*c* requests the application information management module 410*b* for the information on the P2P application program. The application execution monitor module 410*c* transmits a request result to an application policy management and storage module 420*b* of the P2P application policy update unit 420 and inquires a policy item suitable for the executed P2P application program.

In order to control packets that are generated by the corresponding P2P application program on the basis of the inquired policy item, a packet correction module 430*a* of the P2P packet control unit 430 adds identification information on the P2P application program, for example, a P2P application program name, a program identification code, a user ID, and a peer ID, to an IP option field of each packet or corrects the packets by a method of encapsulating each original packet with a separate head including P2P application identification information in the P2P flow agent 400. A packet transmission module 430*b* transmits the corrected packets to the P2P security gateway 200.

The P2P security gateway 200 mainly includes a connection unit for management 210, a live policy update unit 220, a P2P flow agent management unit 230, and a P2P packet control unit 240.

The packets that are received from the P2P flow agent 400 are first transmitted to a flow agent connection module 240*a* of the P2P packet control unit 240, and P2P application identification information of the corresponding packets is detected through a packet monitor module 240*b*. The extracted identification information is inquired to a policy storage module 220*b* of the live policy update unit 220. According to the inquired result, through a packet filter module 240*c*, a proper policy is applied (passage, bandwidth restriction, interception, priority change, or service discrimination).

Then, a P2P manager system 510 of the external policy management system 500 may have access to the P2P security gateway 200 using two methods according to a management object. First, the P2P manager system 510 may be directly connected to a console connection module 210*a* of the connection unit for management 210, and check items necessary for application of the P2P security gateway 200 in a command line environment or change the items and apply the changed items. Second, the P2P manager system 510 may use a web protocol according to the related art, such HTTP or HTTPS, to be connected to a web server module 210*b* of the connection unit for management 210. The P2P manager system 510 may maintain the connection and read operation and management information of the P2P security gateway 200 through an access and control information report module 210*c*.

Meanwhile, if a new policy item that is designed and created by the P2P manager system 510 of the external policy management system 500 is transmitted to the P2P live policy update server 520, the P2P live policy update server 520 updates the policy used in the P2P security gateway with the changed policy. Then, the P2P live policy update server 520 is connected to the live policy update unit 220, such that the changed policy is used for the P2P application detection and traffic control. After receiving the new policy item, the live policy management module 220*a* confirms a policy version and transmits a corresponding item to the policy storage module 220*b*. The policy storage module 220*b* stores and manages the corresponding item. When it is required to inquire the corresponding item, the policy storage module 220*b* provides the related result.

When the P2P security gateway 200 needs to apply the same changed policy item to the P2P flow agent 400, the security gateway connection module 420*a* of the P2P application policy update unit 420 sets separate connection with a flow agent policy management module 230*a* of the P2P flow agent management unit 230, and transmits the related policy item that is corrected to be suitable for the P2P flow agent 400. Preferably, this process is performed on the basis of a push model according to the determination from the P2P security gateway 200 or a pull model where the P2P flow agent periodically performs polling and detects a policy update period. Hereinafter, the application policy management and storage module 420*b* confirms that the corresponding policy is a policy to be newly applied through a verification procedure, such as version checking, and stores the corresponding policy. In addition, the application policy management and storage module 420*b* includes the corresponding policy in the operation of the P2P flow agent 400.

Further, it is preferable that the new policy be updated in real time and included in the operation of the P2P security gateway 200 and the P2P flow agent 400 in real time.

In this case, as the preferred embodiment of the P2P flow agent 400 and the P2P security gateway 200 that are mainly used to implement a method of detecting harmful P2P traffic on the basis of a cooperation model between the P2P security gateway and the P2P flow agent and a control method thereof, the detailed blocks shown in FIG. 5 are not limited to the above description. According to separate requirements from the network designer or the policy manager, segmented or various modules may be additionally mounted and individual modules may be integrated into one large module that manages various module functions.

Hereinafter, the operation flow of the P2P traffic management method according to the embodiment of the invention will be described. A description is not given of a technical portion that can be generally understood to mainly describe the operation characteristics of the invention.

Figure 6:
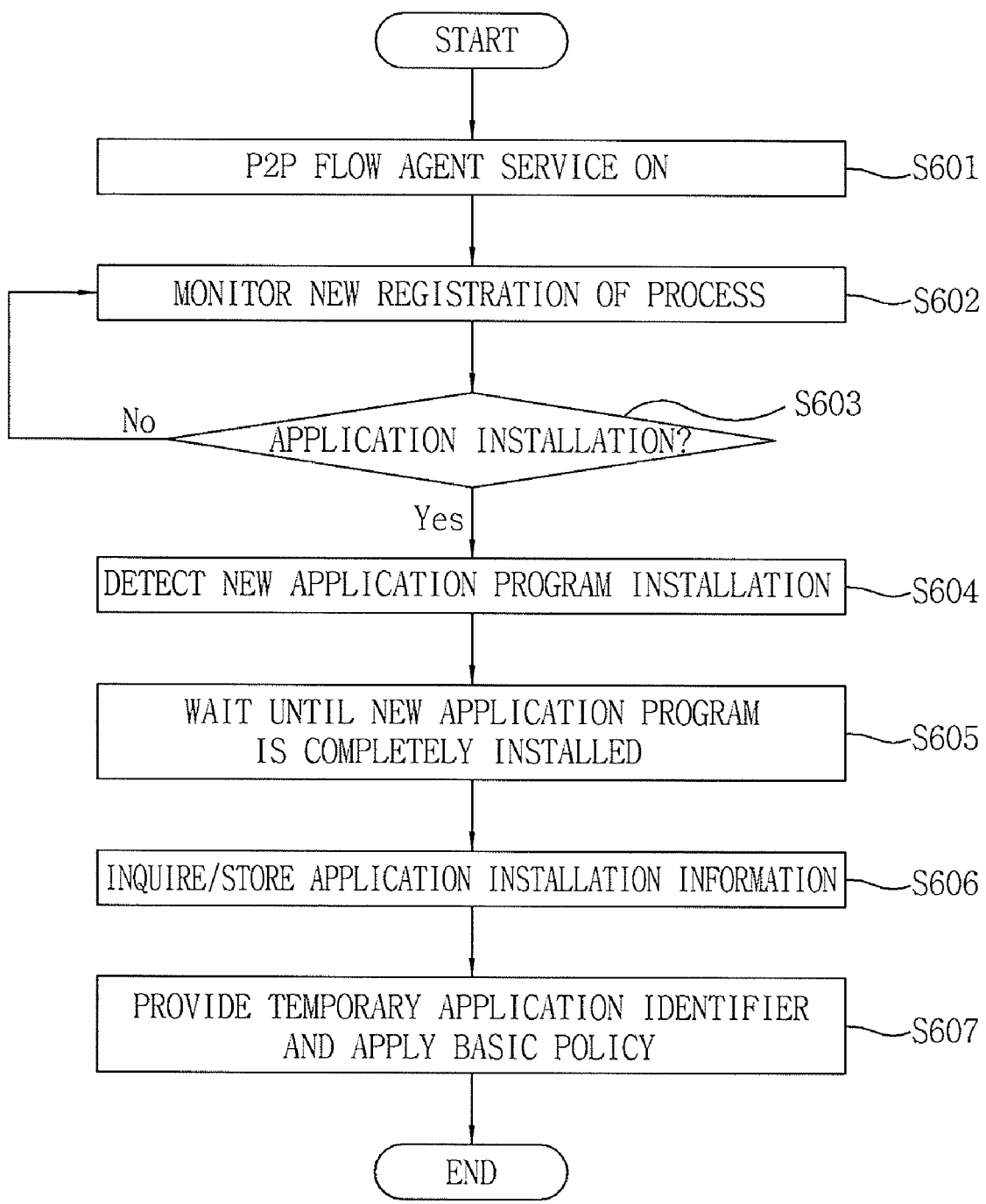
FIG. 6 is a diagram illustrating a process of applying a basic policy in a P2P flow agent according to an embodiment of the invention.

FIG. 6 is a diagram illustrating a process of applying a basic policy in a P2P flow agent according to an embodiment of the invention.

Specifically, FIG. 6 shows a process in which a first peer recognizes a newly registered P2P program and stores and manages information on the P2P program, and applies a basic policy.

When the P2P flow agent service starts (S601), a new registration of a process is monitored (S602). When it is determined that an application program is being newly installed (Yes of S603), the P2P application program installation is detected (S604), and the process enters a waiting state until the new application program is completely installed (S605). If the new application program is completely installed, a related setting item that is written in an operating system when installing the corresponding application program is tracked and stored (S606). Then, an arbitrary application identifier is provided and a basic policy is applied (S607).

According to the preferred embodiment of the invention, the procedure shown in FIG. 6 is continuously performed until the P2P flow agent service is completed.

Figure 7:
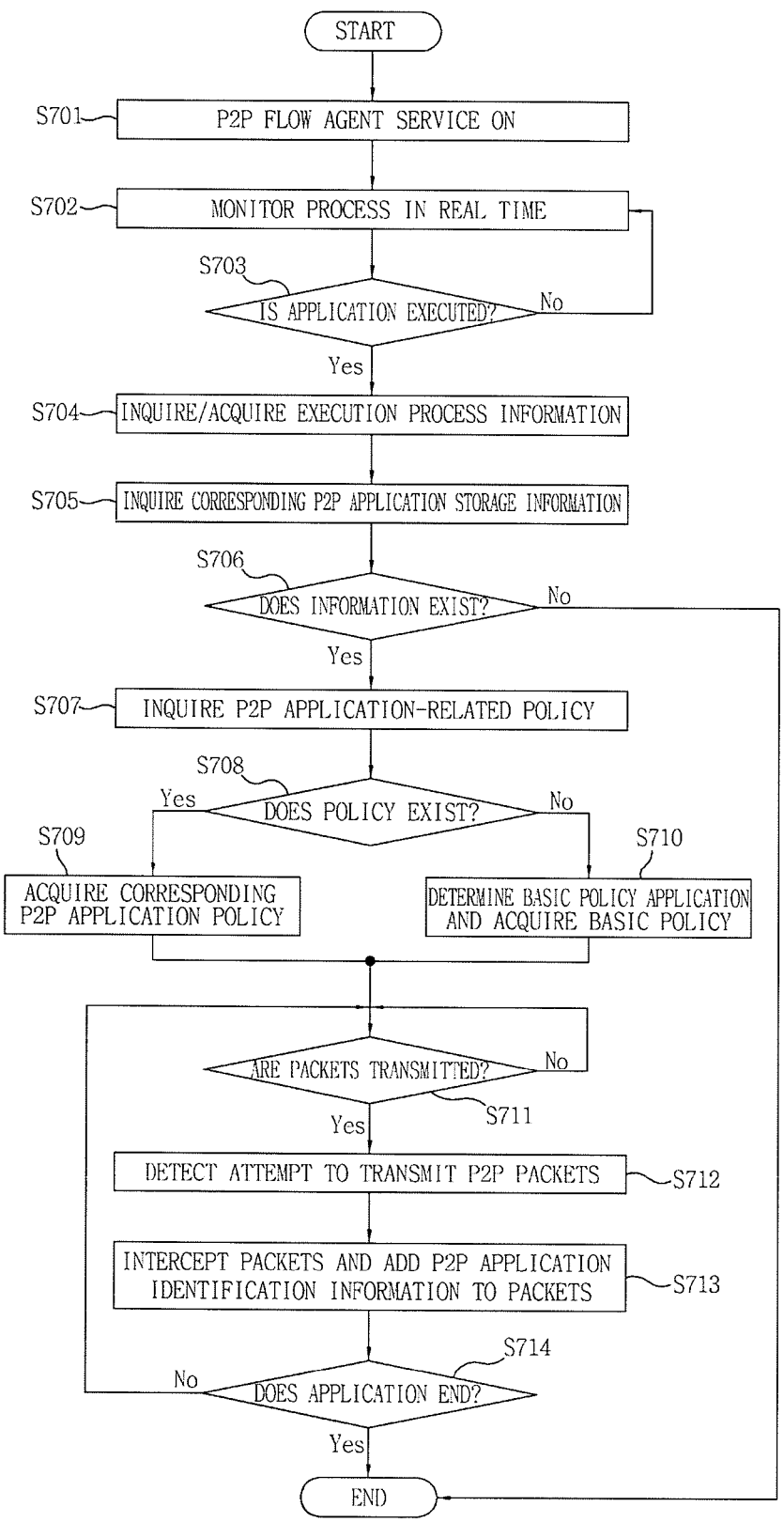
FIG. 7 is a diagram illustrating a process of recognizing a P2P application program, correcting a P2P packet, and transmitting the P2P packet through a real-time monitoring procedure between a P2P flow agent and a P2P security gateway in accordance with an embodiment of the invention.

FIG. 7 is a diagram illustrating a process of recognizing a P2P program, correcting a P2P packet, and transmitting the P2P packet through a real-time monitoring procedure between a P2P flow agent and a P2P security gateway in accordance with an embodiment of the invention.

If the P2P flow agent service starts (S701), the P2P flow agent 400 monitors the executed program in real time (S702). When it is determined that the P2P application is being executed (Yes of S703), the P2P flow agent 400 inquires and acquires real-time execution information (for example, a process name, a process ID, a network bandwidth to be used, and a CPU share) for the corresponding process (S704). On the basis of the acquired information, the P2P flow agent 400 inquires information that is acquired when installing the P2P application program and then stored (S705), which is a procedure that is needed to detect whether the executed process is an instance of the P2P application program.

At this time, when the information for the process exists (Yes of S706), it is inquired whether a P2P application policy related to the corresponding process exists or not (S707). Whether the P2P application policy exists or not is determined (S708), and when it is determined that the P2P application policy exists (Yes of S708), the corresponding P2P application policy is acquired (S709). When it is determined that the P2P application policy does not exist, basic policy application is determined and the basic policy is acquired (S710). The P2P flow agent determines whether the P2P application program attempts to transmit the packet to the network (S711). When an attempt to transmit the P2P packet is detected (S712), the P2P flow agent intercepts the corresponding P2P packet, and performs a correction operation (S713). For example, the P2P flow agent adds, to the packet, information that can discriminate the P2P application on the basis of the acquired policy item until the application is completed (S714).

Preferably, the procedure according to this embodiment is continuously performed until the P2P flow agent service is completed.

Figure 8:
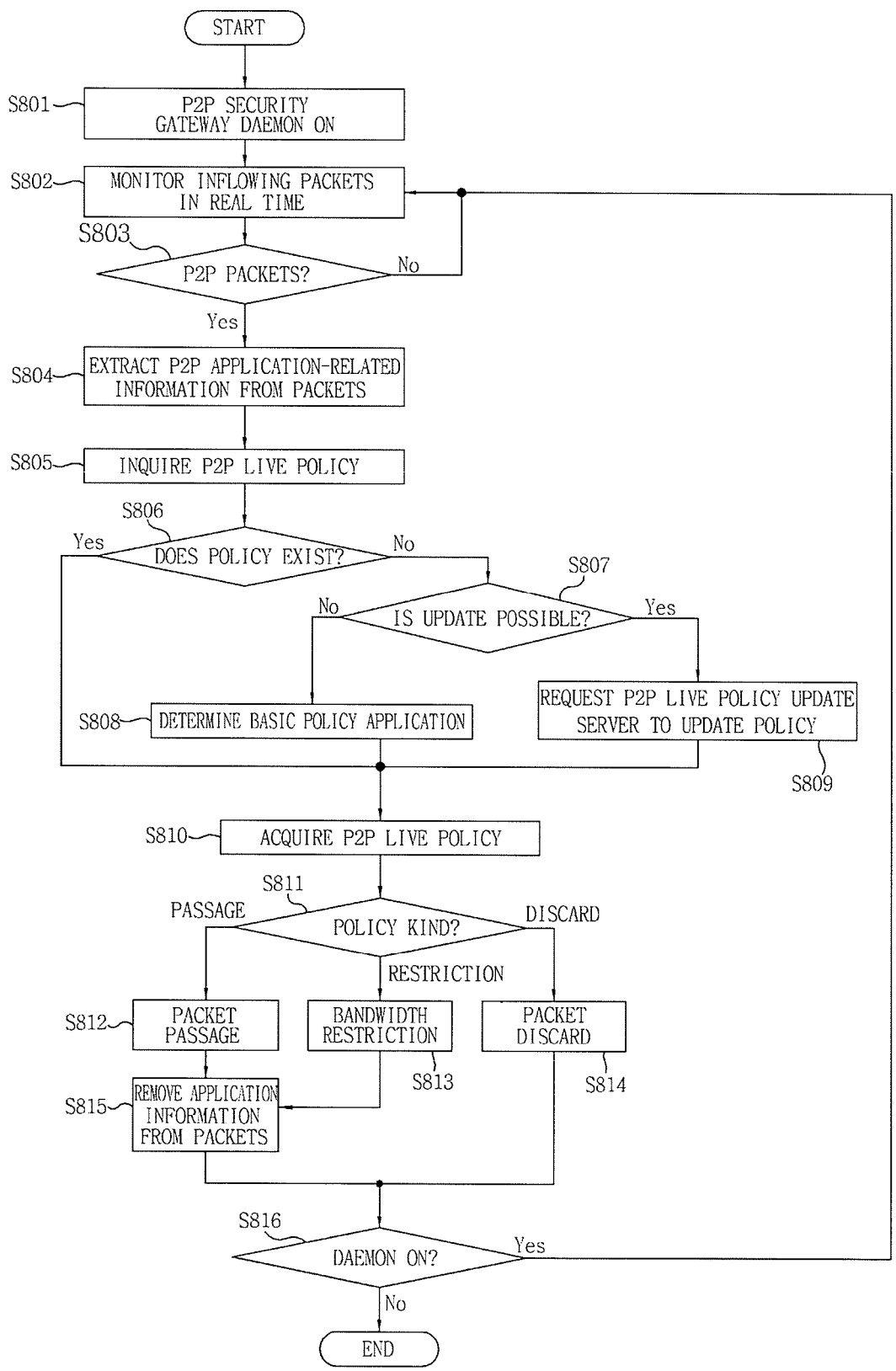
FIG. 8 is a flowchart illustrating a P2P traffic control process through P2P application packet detection between a P2P flow agent and a P2P security gateway in accordance with an embodiment of the invention while focusing on the operation of the P2P security gateway.

FIG. 8 is a flowchart illustrating a P2P traffic control process through P2P application packet detection between a P2P flow agent and a P2P security gateway in accordance with an embodiment of the invention while focusing on the operation of the P2P security gateway.

First, when the P2P security gateway daemon starts (S801), packets, which inflow into the P2P flow agent, are monitored in real time (S802). If a packet that includes a P2P application identifier is discovered (Yes of S803), P2P application-related information is extracted from the corresponding packet (S804). The P2P live policy is inquired using the P2P application identifier included in the P2P application-related information (S805), and whether the P2P live policy exists is determined (S806). If the P2P live policy exists (Yes of S806), the corresponding P2P live policy is acquired (S810). In contrast, if the P2P live policy does not exist (No of S806), the policy update setting is confirmed in order to acquire the related policy (S807). When the update is possible, the P2P live policy update server 100 is requested for a new policy item including an operation and control guide on the P2P application program (S809). However, if the update is impossible or the P2P live policy update server 100 cannot provide the proper new policy item, basic policy application is determined (S808), and the basic policy is acquired as the P2P live policy (S810).

Next, the policy, such as the packet passage (S812), the bandwidth restriction (S813), and the packet discard (S814), may be applied according to the kind of acquired policy (S811). In particular, in the case of the packet passage (S812) or the bandwidth restriction (S813), the information related to the P2P application identification is removed or unencapsulated from the transmitted packet, thereby allowing the packet to be transmitted to a destination through a general network, such as the Internet (S815).

Meanwhile, even after the above-described processes, when the P2P security gateway daemon is continuously performed (No of S816), the above-described processes are preferably repeated.

Figure 9:
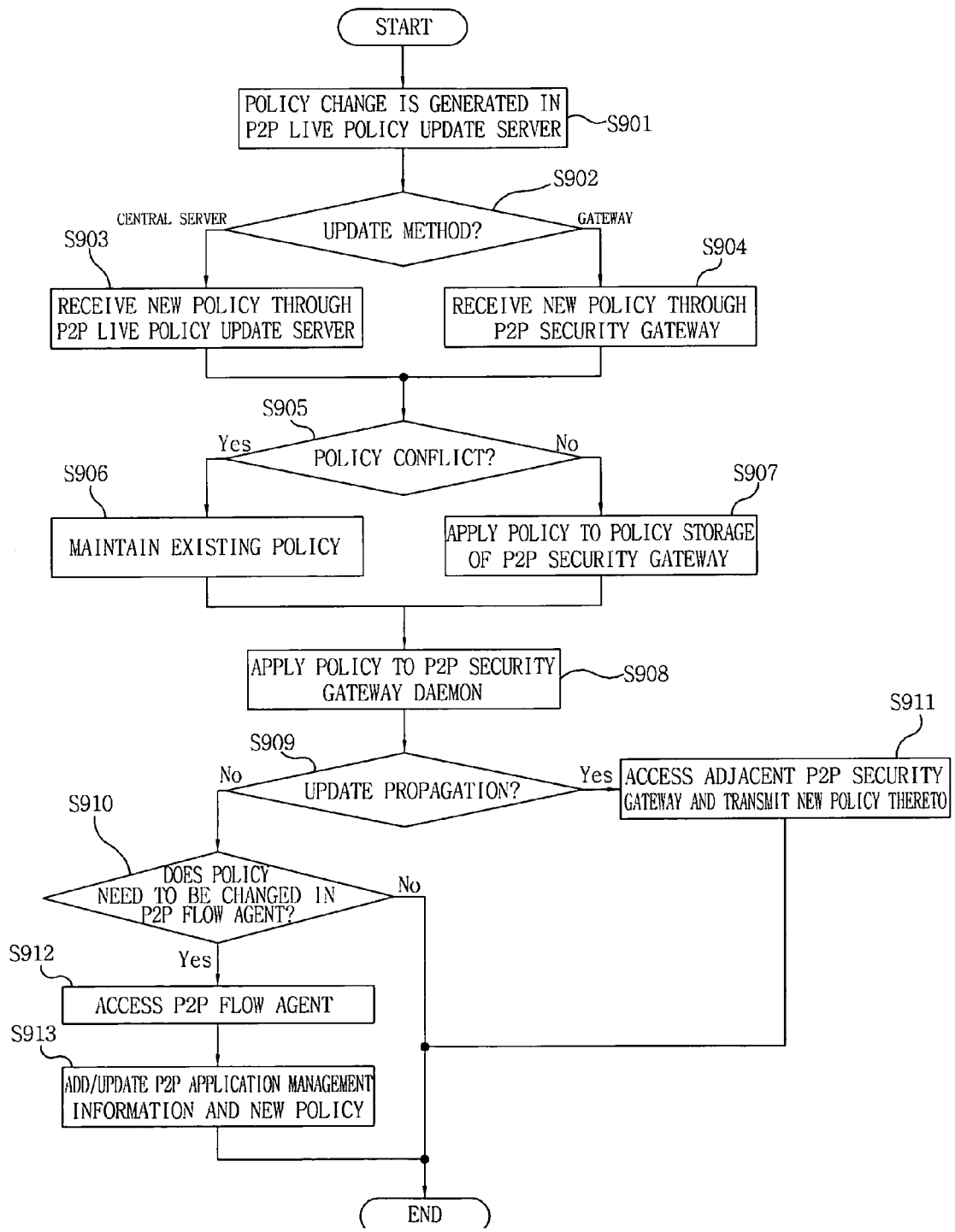
FIG. 9 is a flowchart illustrating the operation of a P2P live policy update process according to an embodiment of the invention.

FIG. 9 is a flowchart illustrating the operation of a P2P live policy update process according to an embodiment of the invention.

In this embodiment, it is assumed that the P2P security gateway 200 and the P2P flow agent 400 receive the new policy item and update the policy.

If the policy change item is generated in the P2P live policy update server 100 (S901), an update method selection procedure is progressed (S902). As the update method, a live policy update method (S903) based on a central server through a P2P live policy update server or a live policy update method (S904) based on a P2P network through mutual connection between a plurality of P2P security gateways may be used. The P2P security gateway 200 receives the new policy by using the selected update method (S903 or S904).

In this case, the selection of the update method may be determined by the network manager in consideration of an OPEX (Operation Expenditure) and a CAPEX (Capital Expenditure) when maintaining and repairing the P2P service network. Alternatively, the selection of the update method may be determined according to a separate algorithm based on a scale of a P2P security gateway that constitutes a P2P security management domain.

Before applying the new policy that is received by one of the two methods, the P2P security gateway 200 inspects whether the new policy conflicts with the existing policy (S905). If the new policy conflicts with the existing policy, the existing policy is maintained (S906). If the new policy does not conflict with the existing policy, the received new policy item is transmitted to the policy storage of the P2P security gateway 200 to inform that the policy conflict inspection is completed, and request the update (S907). In this case, the new policy that is stored in the policy storage is applied to the P2P security gateway daemon in real time (S908), such that the new policy is included in the operation.

When the P2P security gateway determines that the received new policy item needs to be transmitted to other P2P security gateways adjacent to the corresponding P2P security gateway (Yes of S909), the P2P security gateway sets connection with the adjacent P2P security gateways in a one-to-one relation, and performs a verification procedure of a policy version in advance. When a problem does not occur in the verification procedure, the P2P security gateway attempts to transmit the policy item (S911). Each of the adjacent P2P security gateways that receive the new policy item repeats the above-described procedure and updates the policy stored in the storage with the new policy. If the P2P security gateway at the reception side is a final peer that performs the policy update propagation, the policy update propagation using the P2P method will end at this point of time.

If the new policy item does not need to be transmitted to the adjacent P2P security gateways (No of S909), it is determined whether the policy item mounted in the P2P flow agent needs to be changed (S910) When the update is needed (Yes of S910), the P2P security gateway is connected to the P2P flow agent (S912), and requests the P2P flow agent to add or update the P2P application management information and new policy (S913). When the policy change of the P2P flow agent is not needed (No of S910), the P2P policy update process ends.

The above-described process may start upon a direct request from the P2P live policy update server, be made according to the predetermined periodic update time, or start through the confirmation on whether the policy of the P2P security gateway is periodically updated. However, the invention is not limited thereto.

What is claimed is:

1. A peer-to-peer (P2P) traffic management system that manages P2P traffic on a network through which encrypted P2P traffic is exchanged, the P2P traffic management system comprising:
   one or more hardware processors;
   P2P software flow agents, to monitor executed application programs to extract a P2P application program, to add application identifiers to encrypted packets generated by the application program according to a policy set for the extracted P2P application program, and transmits to transmit the encrypted packets;
   P2P software security gateways to monitor the encrypted packets from the P2P software flow agents, to extract the encrypted packets including the application identifiers, to use the extracted application identifiers to inquire and acquire a related policy, and to control the encrypted packets according to the acquired policy; and
   a hardware live policy update server to detect a new policy input from a domain manager and to provide the detected new policy and its operation rules to the P2P software security gateways, wherein the hardware live policy update server configured to transmit the detected new policy and the operation rules to at least one P2P software security gateway on the network, or the hardware live policy update server configured to transmit the detected new policy and the operation rules to one P2P software security gateway and the one P2P software security gateway is configured to receive the detected new policy and to transmit the detected new policy and the operation rules to other P2P software security gateways on the network; and
   wherein the P2P traffic management system is configured to selectively recognize and control the P2P application program that generates the encrypted P2P packets where an inspection on a header or payload of the packets is impossible, to transmit and receive the encrypted packets.

2. The P2P traffic management system of claim 1, wherein the control on the encrypted packets is at least one of selective passage, bandwidth restriction, discard, priority change, and service discrimination of the encrypted packets.

3. The P2P traffic management system of claim 2,
   wherein, in a case of the selective passage and bandwidth restriction of the encrypted packets, the application identifiers are removed or unencapsulated from the encrypted packets, and the encrypted packets are transmitted to the network.

4. The P2P traffic management system of claim 1,
wherein, when detecting execution of the P2P application program, each of the P2P flow agents is configured to use process execution information of the P2P application program to acquire P2P application program information, is configured to use the acquired P2P application program information to inquire the related policy, and, is configured to control the packets according to the acquired policy when the P2P flow agents attempt to generate and transmit the packets from a process of the P2P application program.

5. The P2P traffic management system of claim 1,
wherein each of the P2P security gateways includes:
a live policy update software program executable by the one or more hardware processors to receive a policy item from the live policy update server, to verify whether the received policy item is new and a version thereof conflicts with that of an existing policy, and to update data stored in a policy storage according to a verified result.

6. The P2P traffic management system of claim 1,
wherein the live policy update server is configured to receive the new policy input from the domain manager, to check whether the received new policy violates an existing basic policy, to set the input new policy as a new basic policy according to a checked result, to determine which one of the first live policy update or the second live policy update method is used to update the policy, and to transmit the new policy to the P2P security gateways using the determined update.

7. The P2P traffic management system of claim 6,
wherein, receiving the new policy from the live policy update server when the hardware live policy update server is configured to transmit the detected new policy and the operation rules to one P2P software security gateway and the one P2P software security gateway is configured to receive the detected new policy and to transmit the detected new policy and the operation rules to other P2P software security gateways on the network, the second live, each of the P2P security gateways is configured to transmit the new policy to the other P2P security gateways on the network through a P2P method, and
each of the other P2P security gateways on the network is configured to receive the new policy, to verify a version of the received new policy and whether the version thereof conflicts with that of the existing policy, and to update data stored in an internal policy storage module according to a verified result.

8. The P2P traffic management system of claim 7,
wherein each of the P2P security gateways is configured to confirm whether a new policy item is properly applied, and to determine whether the policy item mounted in the P2P flow agents needs to be changed, to connected to the P2P flow agent, and to request the P2P flow agent to add or update P2P application management information and the new policy when it is determined that the policy item mounted in the P2P flow agents needs to be changed.

9. A computerized peer-to-peer (P2P) traffic management method that manages P2P traffic on a network through which encrypted P2P traffic is exchanged, the P2P traffic management method comprising:
allowing monitoring by P2P flow agents executable by one or more hardware processors executed application programs to extract a P2P application program, adding application identifiers to encrypted packets generated by the application program according to a policy set for the extracted P2P application program, and transmitting the encrypted packets;
monitoring by P2P security gateways executable by the one or more hardware processors the encrypted packets from the P2P flow agents to extract the encrypted packets having the application identifiers, using the extracted application identifiers to inquire and acquire a related policy, and controlling the encrypted packets according to the acquired policy; and
detecting by a hardware live policy update server to detect a new policy input from a domain manager and providing the detected new policy and its operation rules to the P2P security gateway,
wherein the detected new policy is provided to the P2P security gateways using one of the following methods:
a first live policy update method in which the live policy update server transmits the detected new policy to at least one P2P security gateway on the network; and
a second live policy update method in which the live policy update server transmits the detected new policy to one P2P security gateway, and one P2P security gateway receives the detected new policy and transmits the new policy to other P2P security gateways on the network; and
wherein the P2P flow agents, the P2P security gateways and the hardware live policy update server selectively recognizing and controlling the P2P application program that generates the encrypted P2P packets where an inspection on a header or payload of the encrypted packets is impossible, to transmit and receive the encrypted packets.

10. The P2P traffic management method of claim 9,
wherein to add the application identifiers to the packets and transmit the packets by the P2P flow agent includes:
when the P2P flow agent detects execution of the P2P application program, acquiring P2P application program information from the P2P flow agent using process execution information of the P2P application program, and to use the acquired P2P application program information to inquire the related policy; and
when the P2P flow agent detects an attempt to generate and transmit the packets from a process of the P2P application program, allowing controlling by the P2P flow agent the packets according to the inquired policy.

11. The P2P traffic management method of claim 9, further comprising:
receiving by the P2P security gateway a policy item from the live policy update server and verifying whether the received policy item is new and a version thereof conflicts with that of an existing policy; and
updating by the P2P security gateway data stored in a policy storage of the P2P security gateway according to a verified result.

12. The P2P traffic management method of claim 9, further comprising:
receiving by the live policy update server the new policy input from the domain manager, checking whether the received new policy violates an existing basic policy, to set setting the input new policy as a new basic policy according to a checked result, and transmitting the new policy to the P2P security gateway.

* * * * *